Aug. 12, 1930.   C. G. BARRETT   1,772,742
INTERNAL COMBUSTION ENGINE
Filed Dec. 24, 1925

Inventor
Charles G. Barrett,
by W. Schreiber,
Attorney

Patented Aug. 12, 1930

1,772,742

UNITED STATES PATENT OFFICE

CHARLES G. BARRETT, OF SHOREWOOD, WISCONSIN

INTERNAL-COMBUSTION ENGINE

Application filed December 24, 1925. Serial No. 77,555.

The invention relates to internal combustion engines, more especially of the high compression, oil burning injection type, independent of whether it is a two or four cycle operation.

The objects of the invention are:

First. To construct an engine of the above type which is so constructed and arranged as to provide a pre-combustion chamber formed by the piston and inner surface of the cylinder-head, and a main combustion chamber formed by the piston and inner surfaces of the cylinder-head and cylinder.

Second. To construct an engine as herein indicated in which the piston is provided with a cylindrical surface formed on its outer end so as to be concentric with and approximately parallel to the axis of the piston and located relatively near the outer perimeter of the piston-head. A corresponding and similar cylindrical surface is also formed on the inner face of the cylinder head, concentric with and parallel to the axis of the head. The relative location and diameters of these two cylindrical surfaces may be as shown in Figure 1, wherein the cylindrical surface on the outer end of the piston overlaps and surrounds the cylindrical surface on the inner face of the cylinder head as the piston nears its outer dead center; or, as shown in Figure 2, wherein the cylindrical surface on the outer end of the piston enters and is surrounded by the cylindrical surface on the inner face of the cylinder head. In either case, the juxta-position of these two cylindrical surfaces serves to separate the total cylinder clearance volume into two main divisions, the central portion forming what is hereinafter referred to as the pre-combustion chamber, and the outer portion, consisting of an annular space adjacent to the cylinder wall, forming the main combustion chamber.

Third. To provide and arrange an intercommunicating passage between the pre-combustion chamber and the main combustion chamber, referred to above, in such a manner as to most effectively direct the delivery of the main portion of the fuel charge from the pre-combustion chamber to the main combustion chamber, as caused by the pressure rise in the pre-combustion chamber incident to the initial combustion of a portion of the fuel charge therein.

Fourth. To construct and arrange the piston and cylinder head with its pre-combustion chamber, main combustion chamber, and intercommunicating passage referred to above with respect to a multi-jet fuel spray valve so that the fuel jets, when directed in an approximately radial direction, will penetrate the atmosphere of the pre-combustion chamber and form a ring of vaprous fuel at the outer edge of the pre-combustion chamber, thereby promoting an immediate and complete combustion effect in the main combustion chamber as this vaporized fuel charge is blown into the main combustion chamber by the pressure rise produced by the partial combustion occurring in the pre-combustion chamber.

Fifth. To construct and arrange the piston and cylinder head with its pre-combustion chamber, main combustion chamber and intercommunicating passage referred to above, with respect to a suitable fuel spray valve, preferably of the multi-jet type, so that the main movement of the fuel is continuously and progressively outward in an approximately radial direction, producing the main combustion effect adjacent to the outer perimeter of the piston head and thereby aiding in maintaining a cool piston by shortening the path of heat transfer from piston head to cylinder wall.

Sixth. To construct and arrange the piston and cylinder head with its pre-combustion chamber and main combustion chamber, and with an intercommunicating passage formed by the annular clearance ring between the adjacent and overlapping cylindrical surfaces on piston and cylinder head when piston is at or near outer dead center, so that the air movement between pre-combustion chamber and main combustion chamber, when not controlled by combustion effects, may be regulated as to direction and relative violence as the piston moves to its outer dead center position.

Seventh. Other objects and advantages of construction will be apparent from the detailed description and mode of operation of the invention to be presently disclosed.

The invention consists of structural characteristics and relative arrangements of elements which will be hereinafter more fully given and particularly pointed out in the appended claims.

In the drawings in which similar reference characters indicate the same parts in the four figures.

Figure 2:
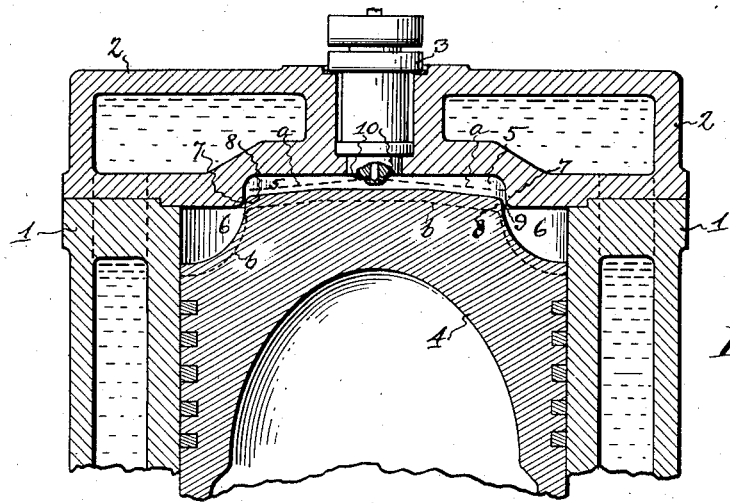
Figure 2 is a similar sectional view showing a second alternate form of the invention in which the cylindrical surface formed on outer end of the piston is made of such size as to enter with suitable clearance the corresponding cylindrical surface formed on the inner face of the cylinder head as the piston completes its outward stroke.

Referring to the drawings, 1 represents the cylinder which is provided with a head 2 having a fuel injection or spray valve 3. With piston 4 at or near outer dead center, the total cylinder clearance volume is divided into a pre-combustion chamber 5 and main combustion chamber 6 by the overlapping of concentric cylindrical surfaces 7 and 8 formed respectively on the inner face of the cylinder head and outer end of the piston. The annular clearance 9 between the adjacent cylindrical surfaces 7 and 8 forms the preferred means of communication between the pre-combustion chamber 5 and main combustion chamber 6.

Figure 4:
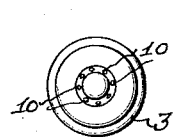
Figure 4 is a bottom view of the distributor plate of the valve shown in Figure 3.
Figure 3:
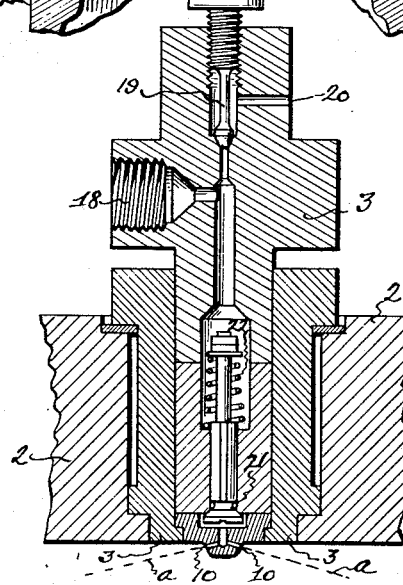
Figure 3 is an enlarged longitudinal sectional view of the valve for spraying or injecting the fuel into the cylinder.

The fuel injection or spray valve 3, shown in detail in Figures 3 and 4, may be of any approved type, but is preferably of the multi-jet type as indicated, in which the opening 18 is connected with any suitable fuel pump, not shown, while 19 is an air relief valve having a discharge opening 20 leading to the atmosphere. 21 is a valve held to its seat by spring 22, and controlling the communication with the orifices 10. The multiple orifices 10 of the spray valve are arranged to direct fuel jets outward in an approximately radial direction as indicated by dotted lines a, a, so as to deliver the main portion of the fuel charge where it will accumulate as a ring of vaprous fuel at the outer edge of the pre-combustion chamber and immediately adjacent to the intercommunicating passage 9.

Figure 1:
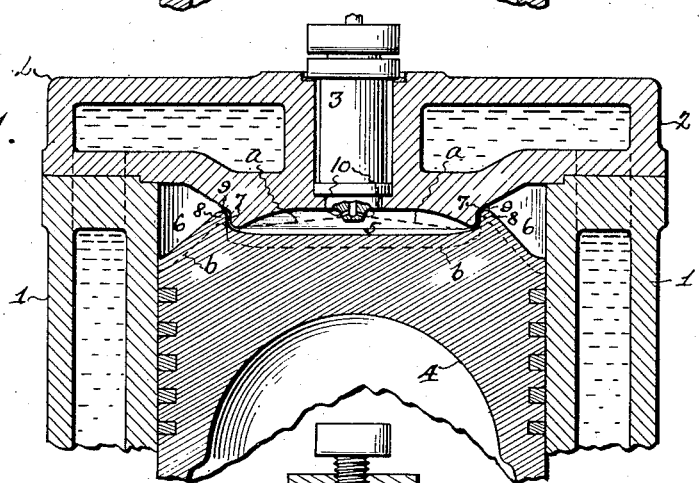
Figure 1 is a longitudinal section of the fuel end of the engine cylinder with piston at outer dead center, showing one alternate form of the invention in which the cylindrical surface formed on the inner face of cylinder head is made of such size as to enter into corresponding cylindrial surface formed on outer end of the piston as the piston completes its outward stroke.

The operation of the invention is as follows:

Assume the piston to be in the position shown by dotted lines b, b, Figures 1 and 2, and moving outward to dead center. The entire aid charge is compressed to a pressure and temperature sufficient to produce automatic ignition of the fuel charge, and the air in the pre-combustion chamber 5 has been definitely blocked off from the air contained in the main combustion chamber 6, except for the communcating passage 9 between the adjacent cylindrical surfaces 7 and 8. Approximately at this position fuel injection is started through the spray valve 3. The character of the fuel jets a, a, is such as to give them sufficient penetration to convey the main portion of the fuel charge outwardly toward the perimeter of the pre-combustion chamber 5, where it vaporizes and forms a ring of gaseous fuel immediately adjacent to the intercommunicating passage 9. During the passage of the fuel jets a, a, through the air of the pre-combustion chamber, a certain portion of the fuel vaporizes from the jets and, combining with the highly heated air in the pre-combustion chamber, produces an initial combustion and consequent pressure rise in this chamber. Fuel injection is preferably completed before or approximately at dead center, depending on conditions of load, and the whole process is such that coincident with the arrival of the piston at outer dead center, the main portion of the fuel charge is accumulated in the pre-combustion chamber as a gaseous ring adjacent to the intercommunicating passage 9, and the pressure rise incident to initial combustion in the pre-combustion chamber has become sufficiently high to blow the gasified fuel charge violently through the passage 9 and into the main combustion chamber 6, where it mixes with the main air charge, effecting rapid and complete combustion as the piston begins its power stroke.

As is usual with engines of the pre-combustion chamber type, the fuel injection is so timed and the combustion chambers and intercommunicating passage are so proportioned as to cause the main combustion to start with the piston just at or slightly after outer dead center and to continue at a rate approximately just sufficient to maintain constant pressure in the cylinder during the combustion period. The engine is thus made to operate on the constant pressure or Diesel cycle, eliminating the tendency toward explosive shocks and detonations which is inherent in engines operating on the constant volume cycle.

A distinctive feature of the present engine as compared to other engines of the precombustion chamber type is in the relative arrangement of pre-combustion chamber and main combustion chamber and the consequent path of fuel travel from the injection valve to the zone of combustion. It is common practice in engines of this general class, engines of the Hvid type excepted, to have the pre-combustion chamber constructed as a fixed part of the cylinder head with the main combustion chamber centrally disposed with reference to the axis of the cylinder and directly in communication with the pre-combustion chamber through a fixed orifice concentric with the axis of the cylinder or through a group of orifices symmetrically arranged about the axis and relatively close thereto. This arrangement of parts results in the general movement of fuel from the spray valve to the combustion zone in lines more nearly parallel to the cylinder axis than radial, and the main combustion takes place adjacent to a relatively small central portion of the piston head area, with a flaming jet or jets of gaseous fuel and air mixture directed toward the central portion of the piston head from the intercommunicating orifice or orifices. The result is an easily overheated piston and a tendency to burn away the central portion of the piston head after substantial periods of operation at full load. Contrasted to the construction just described, the present engine has its main combustion chamber of annular shape located adjacent to the cylinder wall and with the pre-combustion chamber centrally disposed thereto. This arrangement provides for approximately radial movement of the fuel from the spray valve to the zone of combustion, and by confining the main combustion to a space adjacent to the outer edge of the piston head, a relatively cool running piston is insured because of the short path of heat transfer from face of piston to cylinder walls. Furthermore, due to the relatively large diameter of the annular clearance ring between cylinder head and piston, which constitutes the intercommunicating passage between pre-combustion chamber and main combustion chamber, there is a complete absence of any tendency to burn the piston such as ordinarily results from the concentrated heat effects when using orifices or other relatively small diameter passages for delivery of the fuel charge from pre-combustion chamber to main combustion chamber.

A further distinctive feature of the present engine, derived from the relatively large diameter of the intercommunicating passage and the formation of the pre-combustion chamber with relatively large radial dimension and short axial dimension, is the ability to so proportion and design these parts that the fuel injection from spray valve to pre-combustion chamber may be made into a relatively calm and non-turbulent atmosphere, or into an air current moving from pre-combustion chamber to main combustion chamber, instead of into an atmosphere made turbulent by the air blast produced by the outward motion of the piston and directed from the main combustion chamber into the pre-combustion chamber because of the more rapid rise of compression pressure in the latter chamber. The present construction renders it possible to so proportion the relative volumes of pre-combustion chamber and main combustion chamber, the diameter of the intercommunicating passage, and the amount of overlap of the surfaces 7 and 8, as to control the relative pressure rise in pre-combustion chamber and main combustion chamber to produce either a condition of approximate equilibrium and therefore of non-turbulent atmosphere in the pre-combustion chamber at the instant of fuel injection, or a more rapid rise of pressure in the pre-combustion chamber than in the main combustion chamber so as to produce a flow of air from the former to the latter incident to the initial overlapping of the surfaces 7 and 8 and approximately coincident with the beginning of fuel injection. The advantages of injecting into a non-turbulent atmosphere or into an atmosphere where the air currents approximately coincide with the desired direction of fuel movement, as opposed to the more conventional construction where the fuel spray is directed against or across a rather violent air blast coming into the pre-combustion chamber, are as follows:

Firstly, a finer and more nearly atomized spray may be used, since it does not need to have such high penetrative power as would be required to combat opposing air currents.

Secondly, the required deposit of vaporized fuel charge in immediate juxtaposition with the pre-combustion chamber end of the intercommunicating passage is more easily and effectively accumulated due to the relative absence of disturbing air currents. This promotes efficient combustion by insuring the complete and rapid delivery of this fuel charge into the main combustion chamber at the proper time, thereby reducing after-burning to a minimum.

Thirdly, the elimination of a substantial pressure lag in the pre-combustion chamber, such as is necessarily present when the pressure rise in the main chamber is materially more rapid than in the pre-combustion chamber, and as always occurs when the intercommunicating passage consists of a fixed orifice or orifices, makes it possible to obtain automatic ignition of the fuel in the pre-combustion chamber at lower compression pressures, thereby facilitating the so-called "cold starting" of the engine. Also this "cold starting" is further promoted by the ability to make use of a more finely atomized fuel spray, as explained above under paragraph "firstly", a fine spray being more quickly vaporized and ignited than a coarser one under similar heat conditions.

From the foregoing disclosures of construction and operation of the invention, it will be seen that all the advantages and objects recited in the statement of invention have been fully and efficiently carried out, and there is produced an internal combustion engine of the so-called solid injection precombustion chamber type, differing in certain important respects from other existing engines of this general type, all as pointed out and explained above, and while I have shown and particularly described a two cycle type for the reason that the omission of air and exhaust valves from the cylinder head simplifies the design, it will be understood that the same essential constructions and mode of operation are equally well adapted to the four cycle type.

While herein is described and shown the preferred form of my invention, I do not limit myself to this specific arrangement, as many changes and modifications will readily suggest themselves to any one skilled in the art without departing from the spirit of the invention.

What I claim is:

1. An internal combustion engine comprising a cylinder, a piston having a substantially cylindrical surface formed on its outer end, and a cylinder head with a substantially cylindrical surface formed on its inner face, said cylinder head fitted with a fuel injection valve, located at the axis of the cylinder and arranged to deliver its full charge approximately radially outward, all so constructed and arranged as to form, with piston at or near outer dead center, a centrally disposed approximately disc shaped precombustion chamber with axis of the disc parallel to and approximately coincident with the axis of the cylinder, and an annular shaped main combustion chamber adjacent to the outer perimeter of the head of the piston, these two chambers being directly connected only through the intercommunicating passage consisting of the annular clearance space between the opposing and concentric substantially cylindrical surfaces formed on the piston and head, said precombustion chamber being proportioned and arranged to receive from said fuel injection valve substantially the entire fuel charge which is ignited in said precombustion chamber by the heat of compression, and said main combustion chamber being proportioned and arranged to receive that portion of the fuel charge which is forcibly ejected from said precombustion chamber when piston is substantially at or near top center, due to pressure differential between said precombustion chamber and said main combustion chamber.

2. An internal combustion engine comprising a cylinder, a piston having a substantially cylindrical surface formed on its outer end, and a cylinder head having a substantially cylindrical surface formed on its inner face, all so constructed and arranged as to form, with piston at or near outer dead center, a centrally disposed approximately disc shaped precombustion chamber, an annular shaped main combustion chamber adjacent to the outer perimeter of the head of the piston, and an annular shaped intercommunicating passage between the precombustion chamber and the main combustion chamber, and a fuel spray valve in said precombustion chamber situated approximately at the axis of the cylinder and constructed and arranged to deliver substantially the entire fuel charge approximately radially outward directly into the precombustion chamber so that the unburned or partially burned portion of said fuel charge will tend to accumulate around the outer edge of said precombustion chamber preparatory to being forcibly ejected through said intercommunicating passage into said main combustion chamber when piston is substantially at or near top center, due to pressure differential between said precombustion chamber and said main combustion chamber incident to automatic ignition and partial combustion of the fuel charge due to heat of compression in said precombustion chamber.

In testimony whereof, I affix my signature.

CHARLES G. BARRETT.